US012647705B2

(12) United States Patent (10) Patent No.: US 12,647,705 B2

Boyd et al. (45) Date of Patent: Jun. 2, 2026

(54) PON OUT-OF-BAND SIGNALING

(71) Applicant: Ciena Corporation, Hanover, MD (US)

(72) Inventors: Edward Wayne Boyd, Gilbert, AZ (US); Mark Edward Laubach, Redwood City, CA (US); James Harley, Richmond (CA)

(73) Assignee: Ciena Corporation, Hanover, MD (US)

( * ) Notice: Subject to any disclaimer, the term of this patent is extended or adjusted under 35 U.S.C. 154(b) by 364 days.

(21) Appl. No.: 18/483,829

(22) Filed: Oct. 10, 2023

(65) Prior Publication Data

US 2025/0080884 A1 Mar. 6, 2025

Related U.S. Application Data

(60) Provisional application No. 63/580,693, filed on Sep. 5, 2023.

(51) Int. Cl.
*H04J 14/00* (2006.01)
*H04B 10/27* (2013.01)
*H04Q 11/00* (2006.01)

(52) U.S. Cl.
CPC ......... *H04Q 11/0067* (2013.01); *H04B 10/27* (2013.01); *H04Q 2011/0088* (2013.01)

(58) Field of Classification Search
CPC .... H04B 10/27; H04B 10/40; H04B 10/0795; H04B 10/272; H04Q 11/0067; H04J 14/02; H04J 14/0234; H04J 14/0252; H04J 14/0245; H04J 14/0246; H04J 14/0282; H04J 14/0227; H04J 14/0247
USPC ........ 398/66, 67, 68, 69, 70, 71, 72, 98, 99, 398/100, 79, 45, 48, 49, 33, 38, 158, 159,
398/25, 26, 27; 370/352, 392, 389, 468, 370/465
See application file for complete search history.

(56) References Cited

U.S. PATENT DOCUMENTS

| 5,859,716 A | 1/1999 | O'Sullivan et al. |
| 5,959,749 A | 9/1999 | Danagher et al. |
| 6,028,860 A | 2/2000 | Laubach et al. |
| 6,081,533 A | 6/2000 | Laubach et al. |
| 6,111,676 A | 8/2000 | Lemus et al. |

(Continued)

OTHER PUBLICATIONS

C. Eldering et al., "Out of Band Signalling Technique For Passive Optical Networks," International Journal of Digital and Analog Communication Systems, vol. 6, No. 1, Jan. 1, 1993, pp. 49-52.

(Continued)

*Primary Examiner* — Hanh Phan
(74) *Attorney, Agent, or Firm* — Baratta Law PLLC; Lawrence A. Baratta, Jr.

(57) ABSTRACT

An Optical Line Terminal (OLT) system configured to operate in a Passive Optical Network (PON) includes a transmitter configured to communicate with a plurality of Optical Network Units (ONUs) on a downstream channel that is shared by all of the plurality of ONUs; and one or more receivers configured to communicate with the plurality of ONUs on an upstream channel and on an out-of-band channel, wherein the upstream channel is Time Division Multiple Access (TDMA) such that one of the plurality of ONUs transmits at a time. Also, the OLT system can include circuitry configured to cache characteristics of the plurality of ONUs for configuring the receiver.

22 Claims, 3 Drawing Sheets

(56) References Cited

U.S. PATENT DOCUMENTS

| | | | |
|---|---|---|---|
| 6,137,793 | A | 10/2000 | Gorman et al. |
| 6,239,889 | B1 | 5/2001 | Harley et al. |
| 6,323,978 | B1 | 11/2001 | Harley et al. |
| 6,563,829 | B1 | 5/2003 | Lyles et al. |
| 6,574,016 | B1 | 6/2003 | Harley et al. |
| 6,580,498 | B1 | 6/2003 | Harley |
| 6,700,903 | B1 | 3/2004 | Boyd et al. |
| 6,801,547 | B1 | 10/2004 | Boyd et al. |
| 6,859,622 | B1 | 2/2005 | Jiang et al. |
| 6,917,614 | B1 | 7/2005 | Laubach et al. |
| 6,967,949 | B2 | 11/2005 | Davis et al. |
| 7,266,306 | B1 | 9/2007 | Harley et al. |
| 7,321,728 | B2 | 1/2008 | Harley et al. |
| 7,349,537 | B2 | 3/2008 | Kramer et al. |
| 7,525,982 | B2 | 4/2009 | Kramer et al. |
| 7,590,139 | B2 | 9/2009 | Boyd et al. |
| 7,599,400 | B2 | 10/2009 | Roberts et al. |
| 7,599,625 | B1 | 10/2009 | Harley et al. |
| 7,606,498 | B1 | 10/2009 | Wu et al. |
| 7,630,639 | B2 | 12/2009 | Kramer et al. |
| 7,664,019 | B2 | 2/2010 | Boyd et al. |
| 7,676,161 | B2 | 3/2010 | Roberts et al. |
| 7,894,721 | B2 | 2/2011 | Roberts et al. |
| 8,059,970 | B2 | 11/2011 | Harley et al. |
| 8,086,102 | B2 * | 12/2011 | Kim .................. H04Q 11/0067 |
| | | | 398/67 |
| 8,166,365 | B2 | 4/2012 | Harley et al. |
| 8,180,228 | B1 | 5/2012 | Harley et al. |
| 8,230,294 | B2 | 7/2012 | Roberts et al. |
| 8,335,316 | B2 | 12/2012 | Hirth et al. |
| 8,588,257 | B2 | 11/2013 | Boyd et al. |
| 8,737,834 | B2 | 5/2014 | Boyd et al. |
| 8,744,261 | B2 | 6/2014 | Hirth et al. |
| 8,798,470 | B2 | 8/2014 | Boyd et al. |
| 8,848,523 | B2 | 9/2014 | Boyd et al. |
| 8,879,904 | B1 | 11/2014 | Harley et al. |
| 8,903,250 | B2 | 12/2014 | Boyd et al. |
| 8,942,561 | B2 | 1/2015 | Boyd et al. |
| 8,964,538 | B2 | 2/2015 | Kramer et al. |
| 8,964,782 | B2 | 2/2015 | Harley et al. |
| 8,983,309 | B2 | 3/2015 | Harley et al. |
| 9,048,946 | B1 * | 6/2015 | Roberts ................. H04J 3/0682 |
| 9,106,438 | B2 | 8/2015 | Davis et al. |
| 9,113,237 | B2 | 8/2015 | Boyd et al. |
| 9,130,878 | B2 | 9/2015 | Boyd et al. |
| 9,148,224 | B2 | 9/2015 | Diab et al. |
| 9,258,190 | B2 | 2/2016 | Swinkels et al. |
| 9,319,758 | B2 | 4/2016 | Goswami et al. |
| 9,337,929 | B2 | 5/2016 | Boyd et al. |
| 9,413,466 | B2 | 8/2016 | Boyd et al. |
| 9,432,753 | B2 | 8/2016 | Hirth et al. |
| 9,455,785 | B2 | 9/2016 | Boyd et al. |
| 9,479,621 | B2 | 10/2016 | Kliger et al. |
| 9,531,562 | B2 | 12/2016 | Currivan et al. |
| 9,553,744 | B2 | 1/2017 | Prodan et al. |
| 9,577,758 | B2 | 2/2017 | Boyd |
| 9,596,041 | B2 | 3/2017 | Currivan et al. |
| 9,681,209 | B2 | 6/2017 | Boyd |
| 9,774,394 | B2 | 9/2017 | Harley et al. |
| 9,859,984 | B2 | 1/2018 | Harley et al. |

| | | | |
|---|---|---|---|
| 10,236,981 | B2 | 3/2019 | Harley et al. |
| 10,382,134 | B2 | 8/2019 | Boyd et al. |
| 10,547,407 | B2 * | 1/2020 | Cress .................. H04J 14/0249 |
| 10,715,888 | B2 | 7/2020 | Swinkels et al. |
| 10,771,872 | B2 | 9/2020 | Boyd |
| 10,862,963 | B2 | 12/2020 | Boyd et al. |
| 10,863,256 | B2 | 12/2020 | Boyd et al. |
| 10,985,900 | B1 | 4/2021 | Abdo et al. |
| 11,038,549 | B1 | 6/2021 | Harley et al. |
| 11,277,206 | B1 | 3/2022 | Oveis Gharan et al. |
| 11,336,367 | B1 | 5/2022 | Oveis Gharan et al. |
| 11,374,674 | B2 * | 6/2022 | Lin ..................... H04J 14/0236 |
| 2010/0027769 | A1 | 2/2010 | Stevens et al. |
| 2010/0098412 | A1 | 4/2010 | Boyd et al. |
| 2011/0222854 | A1 | 9/2011 | Roberts et al. |
| 2011/0262132 | A1 | 10/2011 | Grindley et al. |
| 2013/0202286 | A1 | 8/2013 | Boyd et al. |
| 2013/0202304 | A1 | 8/2013 | Boyd et al. |
| 2013/0315238 | A1 | 11/2013 | Lamb et al. |
| 2013/0315593 | A1 | 11/2013 | Lamb et al. |
| 2014/0072304 | A1 | 3/2014 | Boyd et al. |
| 2014/0133855 | A1 | 5/2014 | Chaffins et al. |
| 2015/0046775 | A1 | 2/2015 | Prodan et al. |
| 2015/0256284 | A1 | 9/2015 | Laubach et al. |
| 2016/0164632 | A1 | 6/2016 | Oveis Gharan et al. |
| 2018/0145788 | A1 * | 5/2018 | Yoshida .............. H04L 12/2885 |
| 2018/0183525 | A1 * | 6/2018 | Capriata ........... H04B 10/2507 |
| 2020/0036468 | A1 | 1/2020 | Roberts et al. |
| 2022/0294538 | A1 | 9/2022 | Harley et al. |
| 2022/0294604 | A1 | 9/2022 | Oveis Gharan et al. |
| 2023/0198878 | A1 | 6/2023 | Boyd et al. |

OTHER PUBLICATIONS

L. Bertignono et al., "Photon Ranging for Upstream ONU Activation Signaling in TWDM-PON," Journal of Lightwave Technology, vol. 3, No. 8, Apr. 15, 2016, pp. 2064-2071.

F. Effenberger, Futurewei Technologies, "On the concept of out-of-band ranging in TWDM PONs," International Telecommunication Union, COM 15-C 0128-E, Study Period 2013-2016, Jul. 2013, 2 pages.

Nov. 29, 2024, PCT/ISA/206 Invitation to Pay Additional Fees and Communication Relating to the Results of the Partial International Search for International Patent Application No. PCT/US2024/043966.

Claudio Desanti et al., "Super-PON: an evolution for access networks," Journal Optical Communications and Networking, Research Article, vol. 12, No. 10, Oct. 2020, pp. 66-77.

ITU-T Telecommunication Standardization Sector of ITU, G.989.3, "40-Gigabit-capable passive optical networks (NG-PON2): Transmission convergence layer specification," Series G: Transmission Systems and Media, Digital Systems and Networks, Digital sections and digital line system—Optical line systems for local and access networks, May 2021, pp. 1-280.

ITU Publications, International Telecommunication Union, ITU-T G.9807.1, "10-Gigabit-capable symmetric passive optical network (XGS-PON)," Series G: Transmission systems and media, digital systems and networks, Access networks—Optical line systems for local and access networks, Feb. 2023, pp. 1-290.

* cited by examiner

PON OUT-OF-BAND SIGNALING

CROSS-REFERENCE TO RELATED APPLICATION(S)

The present disclosure claims priority to U.S. Provisional Patent Application No. 63/580,693, filed Sep. 5, 2023, and entitled "PON out-of-band signaling and dynamic overhead selection for reduced PON burst overhead," the contents of which are incorporated by reference in their entirety.

FIELD OF THE DISCLOSURE

The present disclosure relates generally to networking and computing. More particularly, the present disclosure relates to systems and methods for Passive Optical Network (PON) out-of-band signaling and dynamic overhead selection for reduced PON burst overhead.

BACKGROUND OF THE DISCLOSURE

PON is a fiber-optic telecommunications technology for delivering broadband network access to end-customers. Its architecture implements a point-to-multipoint topology in which a single optical fiber serves multiple endpoints by using unpowered (passive) fiber optic splitters to divide the fiber bandwidth among the endpoints. There are generally two standards paths for PON-Gigabit Passive Optical Networking (GPON) and Ethernet Passive Optical Networking (EPON). GPON is defined in ITU-T, such as, e.g., (1) ITU-T G.9807.1:10-Gigabit-capable symmetric passive optical network (XGS-PON), February 23, and (2) ITU-T G.989.3:40-Gigabit-capable passive optical networks (NG-PON2): Transmission convergence layer specification, May 21, the contents of each are incorporated by reference in their entirety. EPON is defined in IEEE, such as IEEE 802.3cs-2002, EEE Standard for Ethernet Amendment 2: Physical Layers and Management Parameters for Increased-Reach Point-to-Multipoint Ethernet Optical Subscriber Access (Super-PON), the contents of which are incorporated by reference in their entirety. There are other standards in the GPON and EPON families, as well as new standards for 100 G and beyond. The present disclosure relates to aspects of both approaches, GPON and EPON, as well as any emerging approaches.

BRIEF SUMMARY OF THE DISCLOSURE

The present disclosure relates to systems and methods for Passive Optical Network (PON) out-of-band signaling and dynamic overhead selection for reduced PON burst overhead. Both PON out-of-band signaling and dynamic overhead selection are aspects to optimize the transmissions between Optical Network Units (ONUs) and an Optical Line Terminal (OLT). These approaches are referred to as out-of-band signaling and dynamic overhead selection and both of these approaches are contemplated with GPON, EPON, and the like. Further, these approaches can be used separately as well as in combination with one another.

For PON out-of-band signaling, an OLT supporting a 100 Gbps (or more) single-channel based downstream and upstream and out-of-band signaling would be deployed, the OLT would be continuously receiving both the main upstream channel as well as the out-of-band channel. ONUs supporting the out-of-band feature would de-tune as needed from the main upstream communications channel and initiate discovery using a lower bandwidth, lower data rate communication protocol, the OLT would not need to schedule a quiet window on the main upstream channel. After registration, the ONU tunes to the main communication channel and participates at full line rate. By tuning and de-tuning, this means changing the wavelength of the transmitter at the ONU, off of the main upstream communications channel. Such an approach fits well with next-generation coherent transceivers that can support wavelength tunability. There can be various use cases for the out-of-band signaling, including supporting a vendor-specific communications path, discovery, registration, etc. Advantageously, moving some communications from ONUs off the main upstream communications channel increases bandwidth on the main upstream communications channel as well as provides consistent, observable, and better latency and jitter measurements.

For dynamic overhead selection, with a vendor-specific communications path in an OLT between a Dynamic Bandwidth Assignment (DBA) function and a coherent upstream burst receiver, each upstream burst transmission from an ONU can be identified and stored. As the DBA has knowledge of upstream arrival time of a transmission from each ONU, it will inform the upstream burst receiver to preload those ONUs physical layer parameters permitting faster synchronization and acquisition time. The OLT and DBA will dynamically adjust the burst preamble in subsequent upstream transmission from each identified ONU based on recent upstream activity. In another embodiment, it is also possible to further adjust Forward Error Correction (FEC) parity so that the amount of parity is correlated with an upstream burst transmission. Advantageously, reducing preamble length, FEC parity, etc. supports measurably better upstream transmission performance.

In an embodiment, an Optical Line Terminal (OLT) system configured to operate in a Passive Optical Network (PON) includes a transmitter configured to communicate with a plurality of Optical Network Units (ONUs) on a downstream channel that is shared by all of the plurality of ONUs; and one or more receivers configured to communicate with the plurality of ONUs on an upstream channel and on an out-of-band channel, wherein the upstream channel is Time Division Multiple Access (TDMA) such that one of the plurality of ONUs transmits at a time. The out-of-band channel can be utilized for any of discovery of ONUs of the plurality of ONUs, ranging of the ONUs, and a vendor-specific communications path. The out-of-band channel can be at separate spectrum from the upstream channel.

One or more ONUs of the plurality of ONUs can include a cooled laser for coherent modulation, wherein the one or more ONUs are configured to use the cooled laser to communicate both over the upstream channel and the out-of-band channel, based on tuning the cooled laser to change a wavelength thereof. The one or more receivers can include two receivers with a first receiver for the upstream channel and a second receiver for the out-of-band channel. The out-of-band channel can be a frequency division multiplexed (FDM) side component of the upstream channel. The one or more receivers can include a single receiver configured to simultaneously receive the upstream channel and the out-of-band channel.

The OLT system can further include circuitry configured to implement contention resolution on the out-of-band channel. The contention resolution can include one of (1) providing an affirming response to an ONU, and (2) providing a granting message to the ONU. The downstream channel and the upstream channel can include coherent modulation with signals supporting at least 100 Gb/s.

In another embodiment, an Optical Network Unit (ONU) system configured to operate in a Passive Optical Network (PON) includes one or more transmitters configured to communicate with an Optical Line Terminal (OLT) on an upstream channel and on an out-of-band channel, wherein the upstream channel is Time Division Multiple Access (TDMA) such that one of the plurality of ONUs transmits at a time; and a receiver configured to communicate with the OLT on a downstream channel that is shared by all of the plurality of ONUs. The out-of-band channel can be utilized for any of discovery of the ONU, ranging of the ONUs, and a vendor-specific communications path. The out-of-band channel can be at separate spectrum from the upstream channel.

The one or more transmitters can include a cooled laser for coherent modulation, wherein the cooled laser are utilized to communicate both over the upstream channel and the out-of-band channel, based on tuning the cooled laser to change a wavelength thereof. The one or more transmitters can include two transmitters with a first transmitter for the upstream channel and a second transmitter for the out-of-band channel. The out-of-band channel can be a frequency division multiplexed signal (FDM) side component of the upstream channel. The one or more transmitters can include a single transmitter configured to simultaneously transmit the upstream channel and the out-of-band channel.

The ONU system can further include circuitry configured to implement contention resolution on the out-of-band channel. The contention resolution can include one of (1) receiving an affirming response from the OLT, and (2) receiving a granting message from the OLT. The downstream channel and the upstream channel can include coherent modulation with signals supporting at least 100 Gb/s.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for PON out-of-band signaling and dynamic overhead selection for reduced PON burst overhead.

PON Network

Figure 1:
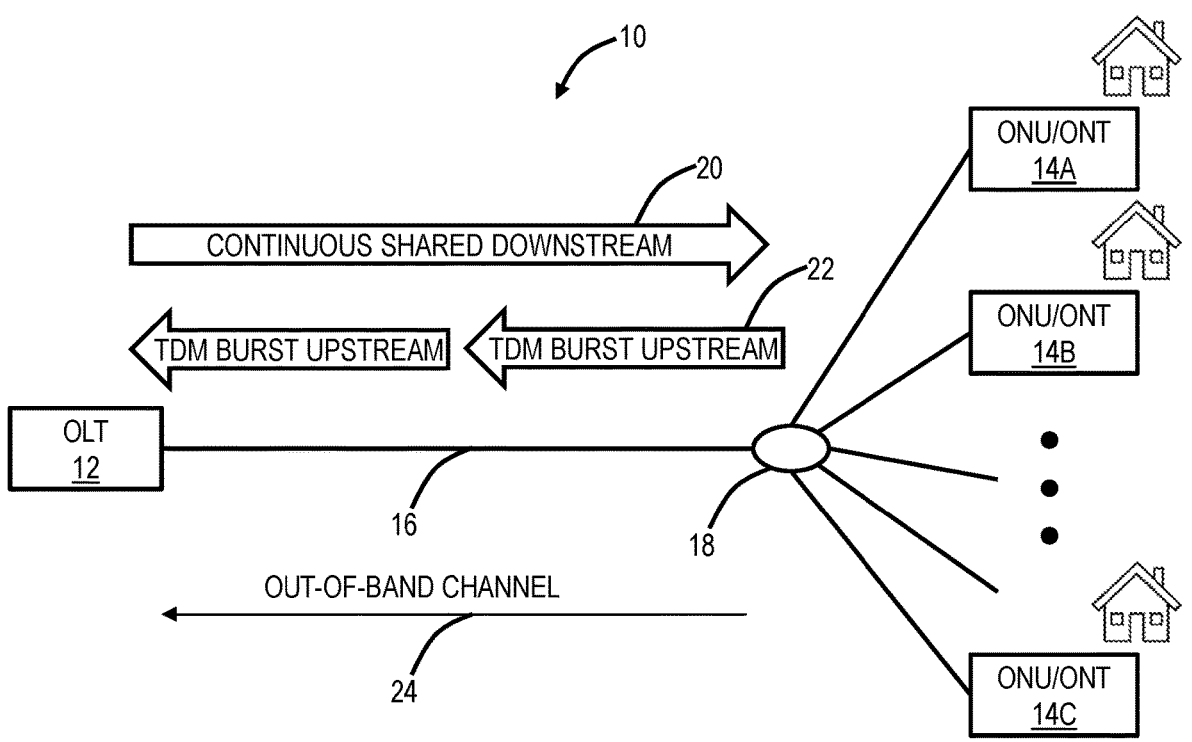
FIG. 1 is a network diagram of an example PON network.

FIG. 1 is a network diagram of an example PON network 10. Time Division Multiple Access (TDMA) PON is deployed using a point-to-multipoint (PtMP) Optical Distribution Network (ODN), and, for illustration purposes, FIG. 1 is a single OLT 12 connected to a plurality of ONUs 14A-12C, via a fiber optical cable 16 that connects to a passive optical splitter 18 thereby connecting the OLT 12 to the multiple ONUs 14A, 14B, 14C. Split ratios are typically deployed with up to 64 (1:64 split) or up to 128 (1:128 split) ONUs 14 per OLT 12. Also, the maximum distance can be up to 20 km on longer (e.g., 30 km) between the OLT 12 and the furthest ONU 14. The PON network 10 generally operates with a maximum differential distance between the closest ONU 14 and furthest ONU 14 of 20 km.

Figure 2:
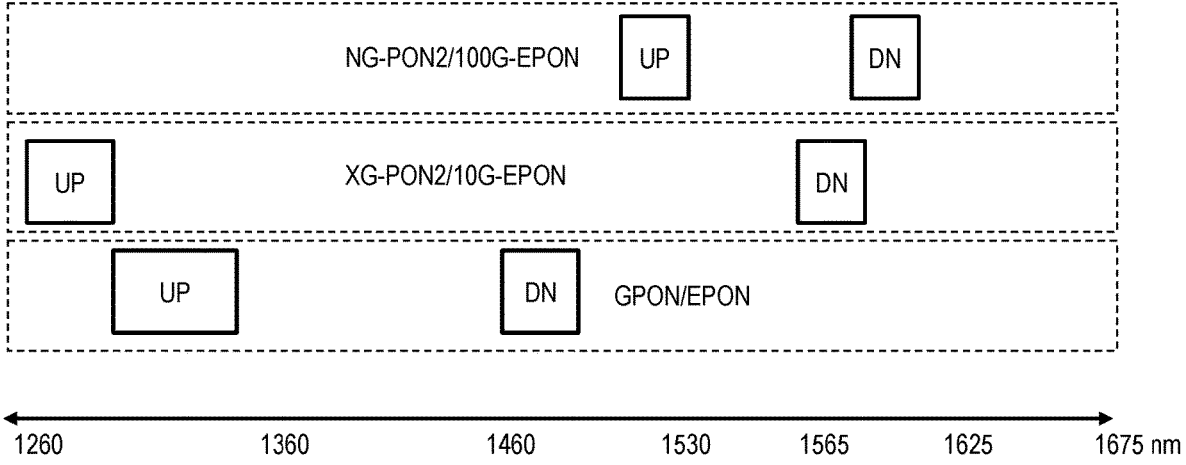
FIG. 2 a is a spectrum diagram illustrating optical spectrum (wavelengths) used for the downstream channel (DN) and an upstream channel (UP) in some example standards.

In the downstream direction (from the OLT 12 to the ONUs 14A, 14B, 14C), i.e., a downstream channel 20, there is a one transmitter at the OLT 12 and each ONU 14A, 14B, 14C has a receiver. The OLT 12 continuously transmits on the downstream channel 20, which is typically at a fixed wavelength that is detailed in the corresponding standard; e.g., ITU-T G.9807.1 is one example. FIG. 2 a is a spectrum diagram illustrating optical spectrum (wavelengths) used for the downstream channel 20 (DN) and an upstream channel 22 (UP) in some example standards. ONUs 14A, 14B, 14C are continuously receiving and demodulating a signal on the downstream channel 20. Unique allocation identifiers are assigned by the OLT 12 during the discovery and registration process such that each ONUs 14A, 14B, 14C can be specifically addressed. That is, each ONU 14A, 14B, 14C receives the same optical signal on the downstream channel 20, based on the passive optical splitter 18 splitting copies to each. The ONUs 14A, 14B, 14C are configured to differentiate their data based on the unique allocation identifiers.

In the upstream direction (from each of the ONUs 14A, 14B, 14C to the OLT 12), i.e., the upstream channel 22, there is one receiver at the OLT and each ONU has a transmitter. The upstream channel 22 is also at a fixed wavelength that is detailed in the corresponding standard; e.g., ITU-T G.9807.1 is one example, with the downstream channel 20 and the upstream channel 22 being at different wavelengths. Transmissions overlapping in time from two or more ONUs 14A. 14B, 14C on the upstream channel 22 create a collision of modulated signals preventing reception and demodulation at the OLT 12. To prevent this, a TDMA mechanism is defined by a PON standard that permits the OLT 12 to grant time-based access to the upstream channel 22 to a specific ONU 14A, 14B, 14C where the grant indicates when in time to start transmitting and for how long (e.g., in time or in bytes).

Based on algorithms used by the OLT's 12 DBA, many ONUs 14A, 14B, 14C can be multiplexed on the upstream channel 22 with no overlapping transmissions. For the TDMA to properly work, ONUs 14A, 14B, 14C must first be discovered and ranged (also known as equalized) to match the OLTs 12 timing for the upstream channel 22. At first ONUs 14A, 14B, 14C are connected to the ODN at an unknown distance from the OLT 12 creating an inherent round-trip-time (RTT) error in timing based the optical signal propagation delay of the fiber. A 20 km maximum differential distance with a 5 usec one-way delay per kilometer, represents a total RTT of 200 usec of potential timing error.

To permit discovery and ranging of a "new" ONU 14A, 14B, 14C, the OLT DBA must periodically allocate a large amount of "dead" time where no in-service ONUs ONU 14A, 14B, 14C except new ONUs ONU 14A, 14B, 14C are permitted to transmit. This is termed a quiet window or a discovery window in PON standards. The length in time of the quiet window includes the RTT along with ONU and OLT processing times. For a 20 km differential distance, this can be 200+50=250 usec. The scheduling of a quiet window can be a fixed interval, for example every 3 seconds, or can be dynamically varied based on other requirements. More than one new ONU can try to register during a quiet window and the PON standard includes mechanisms for detecting overlapping signal transmissions and sorting out using a specified contention resolution mechanism. This quiet window is fundamental for PON systems as it operates with a single-carrier upstream channel utilizing an Impulse Modulated with Direct Detection (IM/DD) scheme. As PON systems become more widely deployed beyond residential access service and opportunistic small business service (i.e., enterprise, cellular fronthaul and backhaul) the occurrence of the quiet window impacts real time services, where the latency and jitter of delivered service becomes more critical (and noticeable by the customer). That is, the quiet window has two disadvantages—it reduces transmission time as well as adds latency to other ONUs.

Thus, PON system deployed today, whether built to ITU-T Study Group 15, Question 2 specification known as "GPON" and those built to IEEE 802.3 Ethernet PON standards known as "EPON" all use IM/DD modulation. The majority of the systems deployed use a single-channel downstream and a single-channel upstream using fixed wavelength laser optics, e.g., optical transceiver. There is an ITU-T variant called NG-PON2 (ITU-T G.989.3) where the system employs eight designated downstream and upstream wavelengths group together as channel pairs. An ONU 14 may be fixed, to operate on one channel pair only, or may be tunable to access one of the eight channel pairs at any given time. An NG-PON2 tunable ONU 14 only has one transceiver and can only tune to one channel pair at a time. OLT-directed tuning from one channel pair to another is possible, but is slow. In an embodiment, it is possible to configure a quiet window on one channel pair for ONU discovery, then after registration, the OLT can direct an ONU to move to a different channel pair that does not allocate a quiet window. The IEEE 802.3 25 G and 50 G EPON specification (802.3ca) specifies two fixed 25 G channel pairs, with no tunability. The system may be deployed with only one-channel pair. For systems deployed with two channel pairs, an ONU need only support one channel pair. If an ONU supports two channels (i.e., two completely separate transceivers), EPON discovery only needs to occur on the one channel that is common to all ONUs. Discussions in the CableLabs CPON (coherent PON) Working Group have so far concluded that a quiet window is needed for a single-channel coherent downstream and upstream model. It has been discussed that when using multiple channels as well multiple subcarrier capable transceivers (and Digital Signal Processors (DSPs)), one channel/sub-carrier can be used for discovery, leaving the others "unburdened".

All PON systems (GPON or EPON) using a single-channel IM/DD for downstream paired with single IM/DD channel for upstream are burdened with having to provide a quiet window on the upstream channel. PON services are being pushed for both speed increases as well as extending application to services that have been more typically served by point-to-point services (e.g., point-to-point Ethernet, IP DWDM) where these services include Enterprise and other Service Level Agreement (SLA) sensitive services and also to cellular back-haul and front-haul services. Pushing single-channel PON approaches in these areas still has the burden of the quiet time that will impinge on latency and jitter performance.

IM/DD and Coherent Optics Moving to Cooled Lasers

Conventionally, PON systems use IM/DD schemes for downstream and upstream communications, over the channels 20, 22. The lasers used to support the products built to these standards have chiefly used fixed wavelength, uncooled lasers and some vendors have the option of using cooled lasers at higher cost and power over uncooled competition. With 25 G and 50 G systems, specifications and products are shifting to use cooled lasers, still at a fixed wavelength. Varying the temperature of a laser changes its tuning. Beyond 50 G systems (i.e., 100+ Gbps) will require a cooled laser in the ONU 14, regardless of vendor. This also includes a switch from IM/DD to coherent modulation to meet the challenges of optical signaling and the physics of higher data rates where DSPs are utilized.

Variously, the present disclosure leverages the cooled laser at the ONU 14 to support wavelength tunability.

Out-of-Band Transmission at the ONU

The present disclosure includes two variants for transmitting an out-of-band signal from the ONU 14 to the OLT 12, outside of the upstream channel 22, on an out-of-band channel 22. One variant is to vary the cooled TX laser frequency by a small amount by changing temperature. This would create a low baud transmission that positioned in frequency to be non-interfering with the main upstream channel 22 in use by the OLT 12 and other active ONUs 14. A second variant is to not change the temperature of the ONU 14 laser, but to include a low baud FDM (frequency division multiplexing) data stream component as part of the overall upstream modulation on the upstream channel 22.

Out-of-Band Reception at the OLT

Also, there can be two variants for receiving the out-of-band signal at the OLT 12 from an ONU 14. One variant is to use two separate coherent demodulators at the OLT 12. One at the main channel rate, to receive the upstream channel 22, and one positioned in frequency to receive the low baud out-of-band signal from ONUs 14. A second variant is to use one coherent demodulator that processes the main upstream channel 22 and simultaneously demodulate the low baud FDM signal from ONUs 14. The second variant requires no additional hardware.

Contention Resolution and Randomization on the Upstream Out of Band Channel

In the out-of-band channel 22, a contention mechanism can be employed to resolve situations where two or more un-registered, new (un-ranged) ONUs 14 transmit with overlapping signals. One variant is that the ONU 14 employs a contention backoff mechanism such as a binary exponential backoff or similar method to randomize its out-of-band small transmission bursts in time for retries if no affirming response is heard from the OLT 12. Another variant is the OLT 12 specifically sends a granting message (e.g., extending the existing Physical Layer Operations, Administration, and Management (PLOAM) to add this capability). This second method would inform any new ONUs waiting to range/register of the availability of the out-of-band channel 22. This second variant may also include a contention resolution mechanism in the ONU to randomize transmission times. A novelty of the out-of-band channel 22 approach is that is continuously available which greatly enhances randomization of transmission times by "new" ONUs 14.

OLT System Supporting an Out-of-Band Channel

In an embodiment, an Optical Line Terminal (OLT) system configured to operate in a Passive Optical Network (PON) includes a transmitter configured to communicate with a plurality of Optical Network Units (ONUs) on a downstream channel that is shared by all of the plurality of ONUs; and one or more receivers configured to communicate with the plurality of ONUs on an upstream channel and on an out-of-band channel, wherein the upstream channel is Time Division Multiple Access (TDMA) such that one of the plurality of ONUs transmits at a time. 1 The out-of-band channel can be utilized for any of discovery of ONUs of the plurality of ONUs, ranging of the ONUs, and a vendor-specific communications path.

The out-of-band channel can be at separate spectrum from the upstream channel. One or more ONUs of the plurality of ONUs can include a cooled laser for coherent modulation, wherein the one or more ONUs are configured to use the cooled laser to communicate both over the upstream channel and the out-of-band channel, based on tuning the cooled laser to change a wavelength thereof. The one or more receivers can include two receivers with a first receiver for the upstream channel and a second receiver for the out-of-band channel. The out-of-band channel can be a frequency division multiplexed (FDM) side component of the upstream channel and having lower baud thereon. Here, the ONU uses a cooled laser for coherent modulation which is slightly detuned (in temperature) to permit a non-interfering lower-bandwidth and lower data rate OLT-known "out of band" communication channel adjacent in frequency to the channel specified in the PON standard. This permits an ONU to be discovered and ranged by the OLT without disrupting the main channel with a quiet window when the out-of-band method is in operation.

The one or more receivers can include a single receiver configured to simultaneously receive the upstream channel and the out-of-band channel. The OLT system can further include circuitry configured to implement contention resolution on the out-of-band channel. The contention resolution can include one of (1) providing an affirming response to an ONU, and (2) providing a granting message to the ONU. The downstream channel and the upstream channel can include coherent modulation with signals supporting at least 100 Gb/s.

ONU System Supporting an Out-of-Band Channel

In another embodiment, an Optical Network Unit (ONU) system configured to operate in a Passive Optical Network (PON) includes one or more transmitters configured to communicate with an Optical Line Terminal (OLT) on an upstream channel and on an out-of-band channel, wherein the upstream channel is Time Division Multiple Access (TDMA) such that one of the plurality of ONUs transmits at a time; and a receiver configured to communicate with the OLT on a downstream channel that is shared by all of the plurality of ONUs. The out-of-band channel can be utilized for any of discovery of the ONU, ranging of the ONUs, and a vendor-specific communications path.

The out-of-band channel can be at separate spectrum from the upstream channel. The one or more transmitters can include a cooled laser for coherent modulation, wherein the cooled laser are utilized to communicate both over the upstream channel and the out-of-band channel, based on tuning the cooled laser to change a wavelength thereof. The one or more transmitters can include two transmitters with a first transmitter for the upstream channel and a second transmitter for the out-of-band channel. The out-of-band channel can be a frequency division multiplexed (FDM) side component of the upstream channel and having lower baud thereon. The one or more transmitters can include a single transmitter configured to simultaneously transmit the upstream channel and the out-of-band channel. The ONU system can further include circuitry configured to implement contention resolution on the out-of-band channel. The contention resolution can include one of (1) receiving an affirming response from the OLT, and (2) receiving a granting message from the OLT. The downstream channel and the upstream channel can include coherent modulation with signals supporting at least 100 Gb/s.

Out-of-Band Signaling Process

Figure 3:
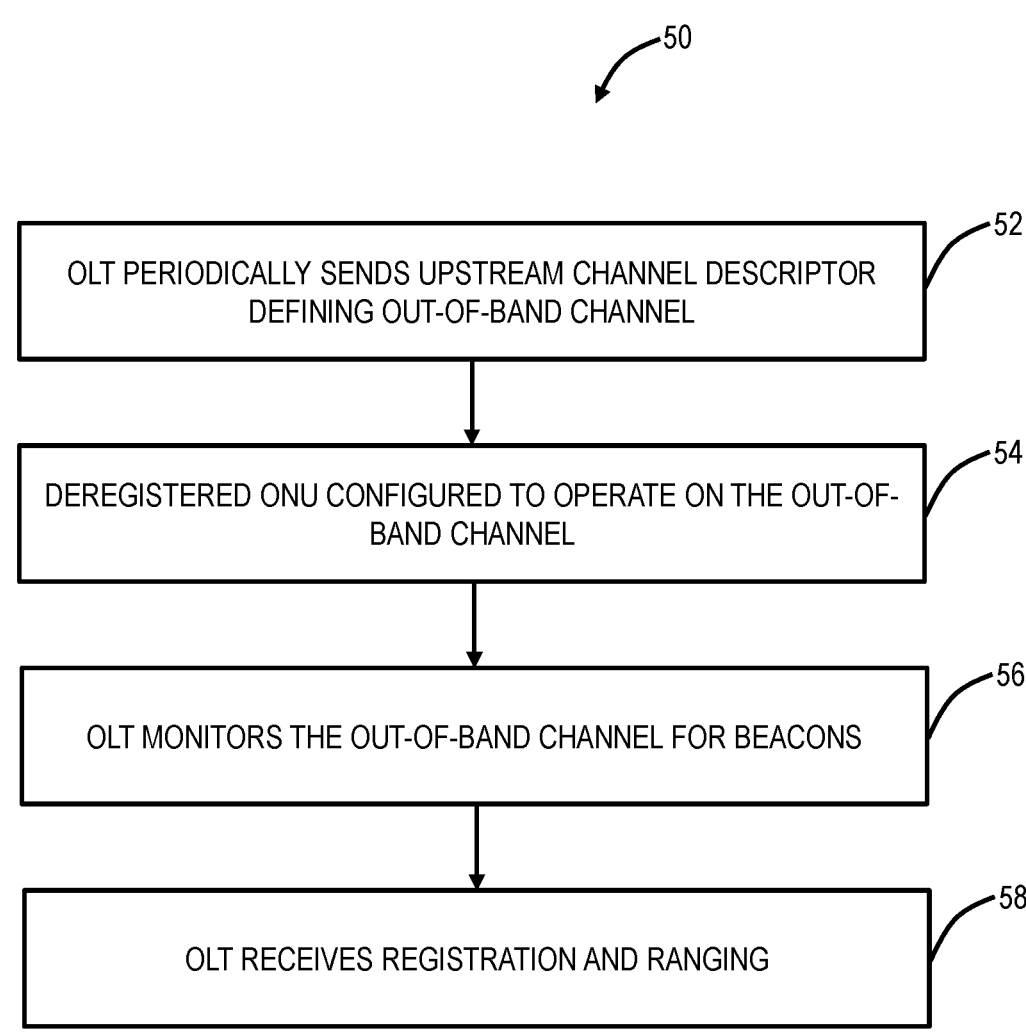
FIG. 3 is a flowchart of an out-of-band signaling process.

FIG. 3 is a flowchart of an out-of-band signaling process 50. The out-of-band signaling process 50 contemplates implementation between an OLT 12 and an ONU 14. The out-of-band signaling process 50 contemplates implementation over the out-of-band channel 24. Specifically, de-registered ONUs 14 can use the out-of-band signaling process 50 to register. Again, using the out-of-band channel 24 advantageously removes the need for a quiet window on the upstream channel 22, improving latency and bandwidth thereon. The out-of-band signaling process 50 also contemplates any of the approaches described herein for forming the out-of-band channel 24, e.g., de-tuning to a different wavelength, FDM, etc., as well as the contention resolution.

The out-of-band signaling process 50 includes the OLT periodically sending an upstream channel descriptor defining out-of-band option (step 52). Here, a new, deregistered ONU can detect the availability of the out-of-band channel 24 and use this for registration and ranging. Of course, if the OLT does not provide the out-of-band option, the standard approach to registration can be used, i.e., the quiet window.

A deregistered ONU can configure itself to operate on the out-of-band channel 24 (step 54), e.g., de-tuning the transmitter, using FDM, etc. Here, the deregistered ONU can look for a downstream Physical Layer Operation Administration and Maintenance (PLOAM) message from the OLT defining the out-of-band option. For cooled optics, the ONU can shift temperature to push the transmitter to the out-of-band channel 24. Also, the ONU can use a random period [to handle multiple access attempts at same time] to send a beacon to OLT at low modulation/rate containing a time reference and vendor Serial Number (SN)/Identifier (ID).

The OLT monitors for beacons on the out-of-band channel 24 (step 58). Again, the OLT can have a separate receiver for the out-of-band channel 24 or a single receiver that detects FDM. The OLT can detect the vendor SN/ID to create a register PLOAM message for the ONU. The OLT can measure the difference between ONU time and OLT expected time to get ranging offset and sets range via a PLOAM message. Finally, the OLT can start granting the ONU upstream slots on the upstream channel 22.

The ONU receives registration and ranging (step 58), such as on the downstream channel 20 and via one or more PLOAM messages. The ONU can reconfigure its transmitter back to the upstream channel 22, if needed, from the out-of-band channel 24, as well as configure the ranging.

IM-DD to Coherent Modulation

Conventionally, PON systems deployed today, whether built to ITU-T Study Group 15, Question 2 specification known as "GPON" and those built to IEEE 802.3 Ethernet PON standards known as "EPON" all use IM/DD modulation. The majority of the systems deployed use a single-channel upstream IM-DD method for burst transmission. As noted above existing standards utilize the upstream burst profile structure to permit any vendors OLT to properly receive burst transmission from any ONU that is implemented to the standard. As standards progress, there has been flexibility added to the defined burst profile structures, but the upstream receiver in the OLT remains entirely asynchronous and by the specification, has no knowledge of what ONU is transmitting. At this time, there is no use of coherent modulation in PON systems.

As the standards move into use of coherent modulation for upstream burst transmission in a PON system, following the existing protocol-layering restrictions or leverage existing past methodology leads to high burst overhead for upstream transmissions.

In FIG. 1, TDMA PON upstream transmissions from any ONU 14A, 14B, 14C to the OLT 12 are in the form of a variable length burst. In normal operation, the OLT 12 grants permission for a single ONU 14A, 14B, 14C to use the upstream channel. This permission is called a grant message or a bandwidth map (BWmap) that allocates a non-overlapping amount of transmission time on the upstream channel to a single allocation identifier. This is referred to as an Alloc_ID in ITU-T GPON standards (allocation identifier) or a Logical Link Identifier (LLID) in IEEE 802.3 EPON standards. For the present disclosure, both the ITU-T GPON and IEEE 802.3 EPON are equivalent. The primary effect is that the specified ONU 14 is given permission to send a transmission that is identified with a start time and a specified length (either time or amount of data). The upstream channel 22 in the PON system 10 is asynchronous in that upstream bursts may start at any time as directed by the OLT 12 and that there will be varying amounts of "dead time" where no transmissions are sent by any ONU 14, depending on system load. There is always a mandatory minimum gap time between transmissions from different ONUs 14 so the first ONUs laser has reduced in power "ramp down" so as to not interfere with the next ONUs laser turn on "ramp up" and signal reception at the OLT's receiver.

In IM-DD modulations, the ONU 14 burst structure is specified to permit interoperability between different vendors as well as be specified by the OLT 12 to adjust for different upstream channel conditions. The OLT 12 directs ONUs 14 to use a specific burst structure using one or more "burst profile" messages. The OLT 12 may communicate more than one burst profile to ONUs 14 that are identified by an index. When the OLT 12 grants an ONU 14 time on the upstream channel 22, it also specifies which burst profile to use for that grant. The OLT 12 may update burst profiles at any time during system operation.

For IM-DD modulation methods, the OLTs 12 upstream asynchronous receiver must be capable of detecting the start of burst, aligning the receiver clock to the burst bit times, apply any automatic gain control for amplitude adjustments, detect end of burst preamble and start of data, receive the data, and either directly or implicitly detect end of burst.

In coherent modulation methods, the asynchronous burst receiver must also align both amplitude and phase to the quadrature I/Q signaling.

In all PON standards to date, the OLT 12 upstream receiver is completely asynchronous in that the physical layer of the standard has no knowledge of which or when any specific ONU 14 is transmitting. Due to the structuring of standards and the layering model employed, there is no defined direct communication path between the functions (i.e., DBA) that know which ONU 14 is transmitting on the upstream asynchronous receiver or when the start of a transmission will be received. Such as path is deemed a "layer violation" and not included in the standard. As such, all upstream bursts profile to date are applied to generally all ONUs running at the same upstream channel speed or distance.

Preamble

Original ITU-T GPON through XG(S)-PON systems specify an upstream physical synchronization block (PSBu) includes a single preamble "segment" and a delimiter. G.9804 High Speed PON (HSP) specifications expand on this where the start of an upstream PHY frame includes a mandatory first PSBu segment (preamble pattern plus delimiter), and then up to three optional PSBu segments the precede the burst data. IEEE 802.3av 10-Gbps EPON (Clause 76) specifies an upstream burst begins with a single Synchronization Pattern (SP) followed by a burst delimiter preceding the burst data. The SP is a fixed value that may be repeated following a Synchronization Time that is specified in the grant to the ONU. The IEEE 802.3ca 25 G and 50 G EPON standard extended the burst structure to begin with an SP1 zone to accommodate laser on time and automatic gain control, an SP2 zone optimized for clock and data recovery, and an SP3 optimized for the start of burst delimiter. The pattern in each SP zone is set by the OLT as well as the number of times each SP Zone is repeated. The CableLabs Coherent PON (CPON) Working Group has been discussing an approach very similar to the IEEE 802.3ca approach for having a highly configurable burst preamble.

What is common with all approaches is the OLT upstream burst receiver is entirely asynchronous for IM-DD methods as well as discussed CableLabs coherent modulation methods. In addition, as the OLT vendor or operator of deployed systems set the parameters allowed by the standard and then very likely never adjust those values during operation. The premise is that the length of the burst preamble remains a fixed larger size and represents a constant overhead to each burst transmission during normal operation. Note that each standard permits variable length bursts. That is, the overhead ratio become less with larger burst sizes. Still, the burst preamble is a fixed size.

It is expected that the next generation of standards, specifically the ITU-T Q2 very high speed PON project currently in requirements phase as document G.Sup.VHSP as well as the CableLabs CPON will both continue to follow the same vendor-agnostic approach for an entirely asynchronous upstream burst receiver method using one or more programmable and flexible burst preamble approaches, following the same use methodology during deployment and system operations, using indexed burst profiles, etc.

Coherent Modulation Using a Reduced Burst Preamble Overhead

In an embodiment, the present disclosure focuses on the use of coherent modulation in the upstream transmission, on the upstream channel 22, using a reduced burst preamble overhead. Specifically, when an ONU 14 first "comes up" on a PON, it waits for a quiet window opportunity for sending its "registration request" burst of information. Of course, the ONU 14 can also use the out-of-band channel 24 described herein. Since the ONU 14 is unknown to the OLT 12 at this time, a larger burst preamble would be used to permit accurate signal acquisition. The OLT 12 system and upstream burst receiver detects propagation delay (to adjust grant timing) and coherent signal characteristics such as optical frequency clock phase, optical phase, etc. for each received upstream burst transmission. Starting with the first identified transmission from the ONU 14, the desired received signal characteristics can be stored (or updated) for the ONU 14, at the OLT 12.

Since the DBA schedules exactly when an identified ONU's 14 upstream burst is to be received, the OLT 12 can include DBA circuitry, firmware, software, etc. that can preload the receiver at the OLT 12 with the previously stored ONU's 14 characteristics. This will permit the optimized coherent upstream burst receiver to more quickly synchronize to the ONU's transmission. This permits using the burst profile capability of the underlaying standard to assign a shorter burst preamble (as allowed by the standard), thereby improving upstream burst transmission efficiency. Furthermore, the DBA circuitry, firmware, software, etc. can track the amount of time between bursts from the same ONU 14 and adjust the burst preamble accordingly in a proportional manner: i.e., a shorter time between bursts from the same ONU 14 would need a shorter burst preamble (e.g., back-to-back transmissions within microseconds or millisecond), and a longer time would need a larger burst preamble to accommodate for any clock or phase drifts. This would be a dynamic adjustment of the burst preamble overhead permitting a PON system with measurably better upstream packet transfer overhead performance. This could be further extended by vendor private extensions for specifying upstream burst profile configuration.

In another embodiment, it is also possible to further adjust FEC parity so that the amount of parity is correlated with an upstream burst transmission. Specifically, the present disclosure contemplates lowering the amount of FEC parity if an upstream burst is small in size. Conventionally, PON systems may be configured to use less FEC parity where an ONU 14 is positioned closer to the OLT 12. The present disclosure contemplates adjusting the FEC parity usage not based on distance, but rather on the size of the upstream burst.

OLT System Supporting Reduced Burst Preamble Overhead

In an embodiment, an Optical Line Terminal (OLT) system configured to operate in a Passive Optical Network (PON) includes a transmitter configured to communicate with a plurality of Optical Network Units (ONUs) on a downstream channel that is shared by all of the plurality of ONUs; a receiver configured to communicate with the plurality of ONUs on an upstream channel, wherein the upstream channel is Time Division Multiple Access (TDMA) such that one of the plurality of ONUs transmits at a time; and circuitry configured to cache characteristics of the plurality of ONUs for configuring the receiver.

The characteristics can include coherent signal characteristics such that the receiver is configured to synchronize with an ONU's coherent transmitter quicker than without the characteristics being preloaded. A burst preamble can be reduced on the upstream channel from a standard length burst preamble due to the characteristics being preloaded. The circuitry can be further configured to uniquely identify the plurality of ONUs, their corresponding characteristics, and an amount of time since a last transmission therefrom. A length of a burst preamble can be based on the amount of time since the last transmission. A length of a burst preamble can be based on the amount of time since the last transmission such that back-to-back bursts on the upstream channel have the length reduced. A length of a burst preamble can be reduced based on the amount of time since the last transmission using proprietary vendor extensions. The receiver can be configured with the corresponding characteristics of an ONU of the plurality of ONUs at a time of an expected burst therefrom. Also, the cached characteristics are obtained from previous transmissions from the plurality of ONUs over the upstream channel.

The circuitry can be further configured to communicate an upstream burst profile configured to an ONU using proprietary vendor extensions. The circuitry can be further configured to direct an identified ONU to use a burst preamble that maintains accurate signal acquisition performance as well as reduces burst preamble overhead, due to the characteristics being preloaded. The circuitry can be further configured to receive and process Forward Error Correction (FEC) parity on the upstream channel in a transmission from an ONU, wherein an amount of the FEC parity is based on a size of data being sent in the transmission.

ONU System Supporting Reduced Burst Preamble Overhead

In another embodiment, an Optical Network Unit (ONU) system configured to operate in a Passive Optical Network (PON) includes a transmitter configured to communicate with an Optical Line Terminal (OLT) on an upstream channel, wherein the upstream channel is Time Division Multiple Access (TDMA) such that one of the plurality of ONUs transmits at a time; a receiver configured to communicate with the OLT on a downstream channel that is shared by all of the plurality of ONUs; and circuitry configured to process data received on the downstream channel and cause data to be transmitted on the upstream channel, wherein the OLT is configured to provide the ONU with an amount of burst preamble overhead to use, based on the OLT caching and preloading characteristics of a signal from the transmitter.

The characteristics can include coherent signal characteristics of the transmitter such that the OLT's receiver is configured to synchronize with the transmitter quicker than without the characteristics being preloaded. A burst preamble can be reduced on the upstream channel from a standard length burst preamble due to the characteristics being preloaded. The OLT uniquely identifies the ONU, the characteristics, and an amount of time since a last transmission therefrom. A length of a burst preamble can be based on the amount of time since the last transmission. A length of a burst preamble can be based on the amount of time since the last transmission such that back-to-back bursts on the upstream channel have the length reduced. A length of a burst preamble can be reduced based on the amount of time since the last transmission using proprietary vendor extensions. A receiver in the OLT is configured with the corresponding characteristics of an ONU of the plurality of ONUs at a time of an expected burst therefrom. The cached characteristics are obtained from previous transmissions from the plurality of ONUs over the upstream channel.

The circuitry can be further configured to receive an upstream burst profile from the OLT using proprietary vendor extensions. The circuitry can be further configured to use a burst preamble that maintains accurate signal acquisition performance as well as reduces burst preamble overhead, due to the characteristics being preloaded. The circuitry can be further configured to transmit Forward Error Correction (FEC) parity on the upstream channel, wherein an amount of the FEC parity is based on a size of data being sent in the transmission.

CONCLUSION

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Further, the various elements, operations, steps, methods, processes, algorithms, functions, techniques, modules, circuits, etc. described herein contemplate use in any and all combinations with one another, including individually as well as combinations of less than all of the various elements, operations, steps, methods, processes, algorithms, functions, techniques, modules, circuits, etc.

What is claimed is:

1. An Optical Line Terminal (OLT) system configured to operate in a Passive Optical Network (PON), the OLT system comprising:
  a transmitter configured to communicate with a plurality of Optical Network Units (ONUs) on a downstream channel that is shared by all of the plurality of ONUs;
  one or more receivers configured to communicate with the plurality of ONUs on an upstream channel and on an out-of-band channel, wherein the upstream channel is Time Division Multiple Access (TDMA) such that one of the plurality of ONUs transmits at a time, and
  circuitry configured to implement contention resolution on the out-of-band channel.

2. The OLT system of claim 1, wherein the out-of-band channel is utilized for any of discovery of ONUs of the plurality of ONUs, ranging of the ONUs, and a vendor-specific communications path.

3. The OLT system of claim 1, wherein the out-of-band channel is at separate spectrum from the upstream channel.

4. The OLT system of claim 3, wherein one or more ONUs of the plurality of ONUs include a cooled laser for coherent modulation, wherein the one or more ONUs are configured to use the cooled laser to communicate both over the upstream channel and the out-of-band channel, based on tuning the cooled laser to change a wavelength thereof.

5. The OLT system of claim 3, wherein the one or more receivers include two receivers with a first receiver for the upstream channel and a second receiver for the out-of-band channel.

6. The OLT system of claim 1, wherein the out-of-band channel is a frequency division multiplexed (FDM) side component of the upstream channel.

7. The OLT system of claim 6, the one or more receivers include a single receiver configured to simultaneously receive the upstream channel and the out-of-band channel.

8. The OLT system of claim 1, wherein the contention resolution includes one of (1) providing an affirming response to an ONU, and (2) providing a granting message to the ONU.

9. The OLT system of claim 1, wherein the downstream channel and the upstream channel include coherent modulation with signals supporting at least 100 Gb/s.

10. An Optical Network Unit (ONU) system configured to operate in a Passive Optical Network (PON), the ONU system comprising:
  one or more transmitters configured to communicate with an Optical Line Terminal (OLT) on an upstream channel and on an out-of-band channel, wherein the upstream channel is Time Division Multiple Access (TDMA) such that one of the plurality of ONUs transmits at a time;
  a receiver configured to communicate with the OLT on a downstream channel that is shared by all of the plurality of ONUs; and
  circuitry configured to implement contention resolution on the out-of-band channel.

11. The ONU system of claim 10, wherein the out-of-band channel is utilized for any of discovery of the ONU, ranging of the ONUs, and a vendor-specific communications path.

12. The ONU system of claim 10, wherein the out-of-band channel is at separate spectrum from the upstream channel.

13. The ONU system of claim 12, wherein the one or more transmitters includes a cooled laser for coherent modulation, wherein the cooled laser are utilized to communicate both over the upstream channel and the out-of-band channel, based on tuning the cooled laser to change a wavelength thereof.

14. The ONU system of claim 12, wherein the one or more transmitters includes two transmitters with a first transmitter for the upstream channel and a second transmitter for the out-of-band channel.

15. The ONU system of claim 10, wherein the out-of-band channel is a frequency division multiplexed signal (FDM) side component of the upstream channel.

16. The ONU system of claim 15, the one or more transmitters include a single transmitter configured to simultaneously transmit the upstream channel and the out-of-band channel.

17. The ONU system of claim 10, wherein the contention resolution includes one of (1) receiving an affirming response from the OLT, and (2) receiving a granting message from the OLT.

18. The ONU system of claim 10, wherein the downstream channel and the upstream channel include coherent modulation with signals supporting at least 100 Gb/s.

19. An Optical Network Unit (ONU) system configured to operate in a Passive Optical Network (PON), the ONU system comprising:
  one or more transmitters configured to communicate with an Optical Line Terminal (OLT) on an upstream channel and on an out-of-band channel, wherein the upstream channel is Time Division Multiple Access (TDMA) such that one of the plurality of ONUs transmits at a time, and the out-of-band channel is at separate spectrum from the upstream channel; and
  a receiver configured to communicate with the OLT on a downstream channel that is shared by all of the plurality of ONUs, wherein the one or more transmitters includes a cooled laser for coherent modulation, wherein the cooled laser are utilized to communicate both over the upstream channel and the out-of-band channel, based on tuning the cooled laser to change a wavelength thereof.

20. The ONU system of claim 19, wherein the out-of-band channel is utilized for any of discovery of the ONU, ranging of the ONUs, and a vendor-specific communications path.

21. An Optical Line Terminal (OLT) system configured to operate in a Passive Optical Network (PON), the OLT system comprising:

a transmitter configured to communicate with a plurality of Optical Network Units (ONUs) on a downstream channel that is shared by all of the plurality of ONUs; and one or more receivers configured to communicate with the plurality of ONUs on an upstream channel and on an out-of-band channel that is at separate spectrum from the upstream channel, wherein the upstream channel is Time Division Multiple Access (TDMA) such that one of the plurality of ONUs transmits at a time, wherein one or more ONUs of the plurality of ONUs include a cooled laser for coherent modulation, wherein the one or more ONUs are configured to use the cooled laser to communicate both over the upstream channel and the out-of-band channel, based on tuning the cooled laser to change a wavelength thereof.

22. The OLT system of claim 21, wherein the out-of-band channel is utilized for any of discovery of ONUs of the plurality of ONUs, ranging of the ONUs, and a vendor-specific communications path.

\* \* \* \* \*